(12) United States Patent
Chiang et al.

(10) Patent No.: US 10,539,281 B2
(45) Date of Patent: Jan. 21, 2020

(54) INTELLIGENT STREET LIGHT STRUCTURE

(71) Applicant: IPSecures Corporation, Taipei (TW)

(72) Inventors: Hung-Hsiang Chiang, Kaohsiung (TW); Kai-Yuan Kuo, Taipei (TW)

(73) Assignee: IPSECURES CORPORATION, Taipei (TW)

( * ) Notice: Subject to any disclaimer, the term of this patent is extended or adjusted under 35 U.S.C. 154(b) by 98 days.

(21) Appl. No.: 15/721,724

(22) Filed: Sep. 29, 2017

(65) Prior Publication Data

US 2018/0094782 A1 Apr. 5, 2018

(30) Foreign Application Priority Data

Sep. 30, 2016 (TW) .............................. 105131547 A

(51) Int. Cl.
| | |
|---|---|
| F21S 8/08 | (2006.01) |
| F21V 23/00 | (2015.01) |
| F21V 33/00 | (2006.01) |
| F21V 31/00 | (2006.01) |
| H05B 37/02 | (2006.01) |

(52) U.S. Cl.
CPC .............. F21S 8/085 (2013.01); F21V 23/00 (2013.01); F21V 23/002 (2013.01); F21V 31/00 (2013.01); F21V 33/0088 (2013.01); H05B 37/0272 (2013.01)

(58) Field of Classification Search
CPC .......... F21S 8/085; E04H 12/08; F21V 21/10; F21V 23/00; F21V 23/002; F21V 31/00; F21V 33/0088; F21V 29/83; F21V 15/00; F21V 31/03; H05B 37/0272; F21W 2131/103; Y02B 20/48
See application file for complete search history.

(56) References Cited

U.S. PATENT DOCUMENTS

| | | | | |
|---|---|---|---|---|
| 5,886,738 A | * | 3/1999 | Hollenbeck ...... | G08B 13/19619 340/936 |
| 6,222,503 B1 | * | 4/2001 | Gietema ............. | H01Q 1/1207 343/700 MS |
| 8,558,413 B1 | * | 10/2013 | Lepard ................ | F21V 33/0052 307/150 |
| 2007/0222581 A1 | * | 9/2007 | Hawkins ............. | G06Q 20/127 340/539.1 |
| 2009/0040750 A1 | * | 2/2009 | Myer ..................... | F21S 8/083 362/183 |
| 2011/0085322 A1 | * | 4/2011 | Myer ..................... | F21S 8/083 362/183 |

(Continued)

FOREIGN PATENT DOCUMENTS

| | | | |
|---|---|---|---|
| CN | 1885736 A | * | 12/2006 |
| CN | 201078808 Y | * | 6/2008 |
| CN | 202308281 U | * | 7/2012 |

(Continued)

Primary Examiner — Mary Ellen Bowman
(74) Attorney, Agent, or Firm — Chun-Ming Shih; LanWay IPR Services

(57) ABSTRACT

An intelligent street light structure includes an antenna, a data transmission system and wires. This makes the intelligent street light structure have a remote data transmission function and also effectively protect the antenna and the data transmission system provided therein again external invasion.

17 Claims, 5 Drawing Sheets

(56) References Cited

U.S. PATENT DOCUMENTS

2015/0362172 A1* 12/2015 Gabriel ............... G08B 15/001
                                                         348/151

FOREIGN PATENT DOCUMENTS

| CN | 203949068 U | * | 11/2014 | ............ H04W 88/08 |
| CN | 204593136 U | * | 8/2015 | |
| CN | 205039235 U | * | 2/2016 | |
| CN | 205305124 U | * | 6/2016 | ............ H04W 88/08 |
| CN | 106224864 A | * | 12/2016 | |
| JP | 3187291 U | * | 11/2013 | |
| KR | 789313 B1 | * | 12/2007 | |
| ZA | 201101435 A | * | 11/2011 | |

* cited by examiner

INTELLIGENT STREET LIGHT STRUCTURE

CROSS-REFERENCE TO RELATED APPLICATIONS

This application claims the priority of Republic of China Patent Application No. 105131547 filed on Sep. 30, 2016, in the State Intellectual Property Office of the R.O.C., the disclosure of which is incorporated herein by reference.

BACKGROUND OF THE INVENTION

Field of the Invention

The invention relates to street light structures, and more particularly, to an intelligent street light structure having a remote data communication function.

Descriptions of the Related Art

Intelligent city developments bring about increasing requirements on coverage, signal strength and capacities of communication networks. Current base stations however do not have sufficient channel capacities and are not able to meet such growing demands of communication service. An effective solution to this problem is to build new mobile communication base stations.

Nevertheless, urban public land available for communication operators to build base stations is becoming limited due to rapid developments in the city, and more and more residents protest against building the base stations, thereby leading to great difficulty in finding a place where the base stations can be built.

Traditional street lights are widely distributed in the city and thus can serve as excellent carriers for communication transmission. Such great coverage and even distribution advantages of the street lights happen to meet the requirements for signal coverage of communication networks and density of base stations. Therefore, how to structurally modify a current street light to make it maintain its original lighting function and also satisfy functional requirements of data communication, without undesirably changing the overall appearance of the current street light, is thus an important task in the art.

SUMMARY OF THE INVENTION

In view of the above drawbacks in the prior art, a primary object of the invention is to provide an intelligent street light structure for accommodating an antenna and a data transmission system so as to serve as a mobile communication base station. This may solve the existing problem of having difficulty in finding a place where base stations can be built, reduce construction costs and shorten construction periods of base stations, and improve utilization of public resources.

Another object of the invention is to provide an intelligent street light structure, the antenna and the data transmission system accommodated in the intelligent street light structure may retain the original appearance of the street light and are effectively protected against external invasion.

For the objects said above and for other objects, the invention provides an intelligent street light structure including at least one antenna, a data transmission system and wires for interconnecting the antenna and the data transmission system, the intelligent street light structure further including: a hollow lamppost having a receiving space therein for accommodating the data transmission system; a cap provided at top of the hollow lamppost, the cap having an antenna mounting pole and at least one through hole, wherein the antenna mounting pole is for mounting the antenna thereon, and the through hole allows the wires to pass therethrough; a non-metallic shield mounted on the cap, for protecting and shielding the cap; and at least one binding part for binding at least one of the non-metallic shield and the cap to the hollow lamppost.

Preferably, for the intelligent street light structure said above, wherein further includes: at least one external device, and a light armature holder/fixture that is provided on the hollow lamppost and for mounting the external device, wherein the wires are for interconnecting the antenna, the data transmission system and the external device. The external device is one of an IP device and a sensor.

Preferably, for the intelligent street light structure said above, wherein in the receiving space there are formed a carrier structure and a liquid guiding structure, wherein the carrier structure is for carrying the data transmission system thereon, and the liquid guiding structure is located above the carrier structure, for guiding any liquid inside the receiving space to flow away from the data transmission system.

Preferably, for the intelligent street light structure said above, wherein the hollow lamppost further has an operation hole and a cover plate for opening or closing the operation hole to expose or cover the receiving space.

Preferably, for the intelligent street light structure said above, wherein further includes: a wireless control opening/closing lock which can control the opening and closing of the cover plate by wireless communication, open and close the operating hole.

Preferably, for the intelligent street light structure said above, wherein the hollow lamppost or the cover plate has at least one vent for dissipating heat or moisture from the receiving space.

Preferably, for the intelligent street light structure said above, wherein the receiving space is located in a base of the hollow lamppost.

Preferably, for the intelligent street light structure said above, wherein further includes: a pumping device, which is activated to discharge any liquid in the hollow lamppost when the liquid is over a predetermined warning level, wherein the predetermined warning level is lower than a height of a position where the data transmission system is situated.

Preferably, for the intelligent street light structure said above, wherein further includes: a wiring part provided in the cap or the hollow lamppost, which is extended from the cap into the hollow lamppost or is directly placed inside the hollow lamppost, wherein the wiring part is for guiding the wires to be extended inside the hollow lamppost in a predetermined direction, path, position or curvature. The wiring part is a hooking part, a wire material part, a wire way part or a tubing part.

Preferably, for the intelligent street light structure said above, wherein further includes: a lightning rod provided at top of the non-metallic shield.

Preferably, for the intelligent street light structure said above, wherein the data transmission system includes a data transmission device, a data exchange device and a plurality of network devices, which are interconnected, wherein the data transmission device allows data transmission between itself and the outside, and the data exchange device is respectively connected to the data transmission device and the plurality of network devices, for providing service of data exchange and transmission between the plurality of network devices and the data transmission device.

Preferably, for the intelligent street light structure said above, wherein the data transmission system further includes a power distribution unit electrically connected to a power system, a UPS power supply device or both, for providing electricity required for operation.

Preferably, for the intelligent street light structure said above, wherein the wires are electric cables, optical cables, or a combination thereof.

Preferably, for the intelligent street light structure said above, wherein the cap is formed with two through holes, which are arc-shaped and provided on two sides of the antenna mounting pole.

Preferably, for the intelligent street light structure said above, wherein the binding part is a lock part that in turn penetrates the non-metallic shield, the cap and the hollow lamppost.

Preferably, for the intelligent street light structure said above, wherein the binding part is a fastening part for fastening the non-metallic shield to the cap and the hollow lamppost.

Compared to the conventional technology, the intelligent street light structure of the invention includes an antenna and a data transmission system to make a traditional street light have a remote data transmission function. Further, the structural design of having a cap, a non-metallic shield and a binding part may retain the original appearance of the street light and effectively protect the antenna and the data transmission system accommodated in the intelligent street light structure against external invasion.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
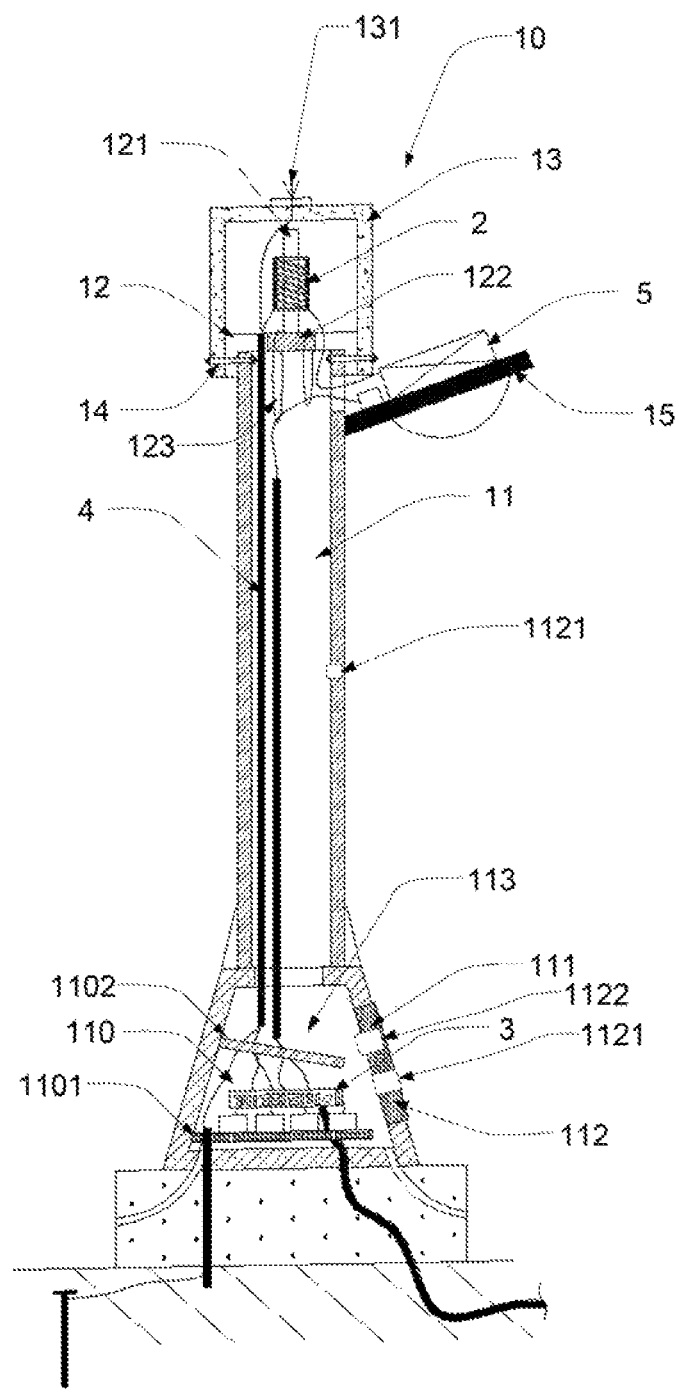
FIG. 1 is a structural schematic diagram of an intelligent street light structure according to a first embodiment of the invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 2:
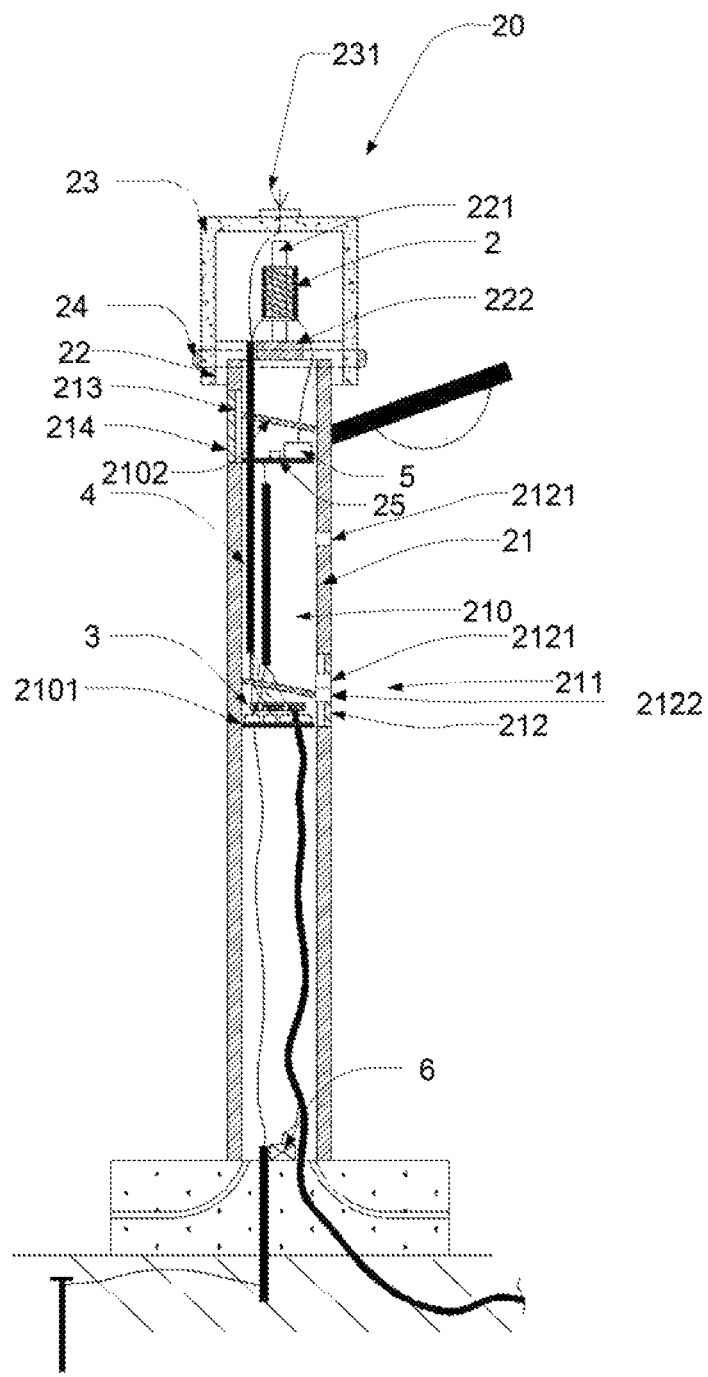
FIG. 2 is a structural schematic diagram of an intelligent street light structure according to a second embodiment of the invention.

Referring to FIGS. 1 and 2, FIG. 1 is a structural schematic diagram of an intelligent street light structure 10 according to a first embodiment of the invention, and FIG. 2 is a structural schematic diagram of an intelligent street light structure 20 according to a second embodiment of the invention. The intelligent street light structure 10, 20 differs from a conventional street light in that, it includes at least one antenna 2, a data transmission system 3 and wires 4. The wires 4 are, for example, electric cables, optical cables, or a combination thereof (i.e. composite optical cables), and are connected to the antenna 2 and the data transmission system 3 respectively to make those two interconnected so as to perform power or data transmission. Thus, besides the original lighting function, the intelligent street light structure 10, 20 of the invention also has a remote data transmission function.

As shown in FIGS. 1 and 2, the intelligent street light structure 10, 20 includes a hollow lamppost 11, 21, a cap 12, 22, a non-metallic shield 13, 23, and a binding part 14, 24. The hollow lamppost 11, 21 is a hollow cylinder of any shape, such as circular cylinder, square cylinder, hexagonal cylinder and so on. It is formed with a receiving space 110, 210 therein for accommodating the data transmission system 3. In the embodiment shown in FIG. 1, the receiving space 110 is located in a base 113 of the hollow lamppost 11; while in the embodiment shown in FIG. 2, the data transmission system 3 can be provided at any suitable position in the receiving space 210 of hollow lamppost 21, for example, at a middle position of the receiving space 210.

Further in the receiving space 110, 210 there are formed a carrier structure 1101, 2101 and a liquid guiding structure 1102, 2102. The carrier structure 1101, 2101 may be composed of a rail, a mounting support and a carrier board, and is used for mounting the data transmission system 3 thereon. The liquid guiding structure 1102, 2102 is located above the carrier structure 1101, 2101, and used to guide any liquid inside the receiving space 110, 210 to flow away from the data transmission system 3 to be discharged out of the receiving space 110, 210, in order to protect the data transmission system 3 in the receiving space 110, 210 from being damaged by external contaminants (such as water drops and dust). It should be noted that the intelligent street light structure 10, 20 of the invention is not limited to the above structural arrangements but is flexible in design according to practical requirements.

Referring to FIG. 2, in this embodiment, there may further be provided a pumping device 6 in the receiving space 210. The pumping device 6 is activated to discharge the liquid from the receiving space 210 when the liquid inside the hollow lamppost 21 (or the receiving space 210) is over a predetermined warning level, wherein the predetermined warning level is lower than a height of the position where the data transmission system 3 is situated in the receiving space 210 so as to protect the data transmission system 3 against flooding.

As shown in FIGS. 1 and 2, the hollow lamppost 11, 21 is further formed with an operation hole 111, 211 and a cover plate 112, 212, wherein the cover plate 112, 212 may open or close the operation hole 111, 211 to expose or cover the interior receiving space 110, 210. This structural design allows an operator to perform routine operations, such as installation or maintenance, on the data transmission system 3. Preferably, the intelligent street light structure 10, 20 of the present invention may be provided with a wireless control opening/closing lock 1122, 2122, which is, for example, a Bluetooth lock, for enabling an operator to control the opening and closing of the cover plate by means of a wireless communication to secure the data transmission system 3 in the interior receiving space 110, 210. The hollow lamppost 11, 21 and/or the cover plate 112, 212 may further be formed with at least one vent 1121, 2121, which is used for ventilation, for heat dissipation of the data transmission system 3 provided in the receiving space 110, 210 or for moisture escape from the receiving space 110, 210, so as to ensure the data transmission system 3 operating properly.

Preferably, there is further provided a waterproof layer on the hollow lamppost 11, base 113 and cover plate 112 shown in FIG. 1 and on the hollow lamppost 21 and cover plate 212 shown in FIG. 2, in order to prevent rain drops from entering the receiving space 110, 210.

Figure 5:
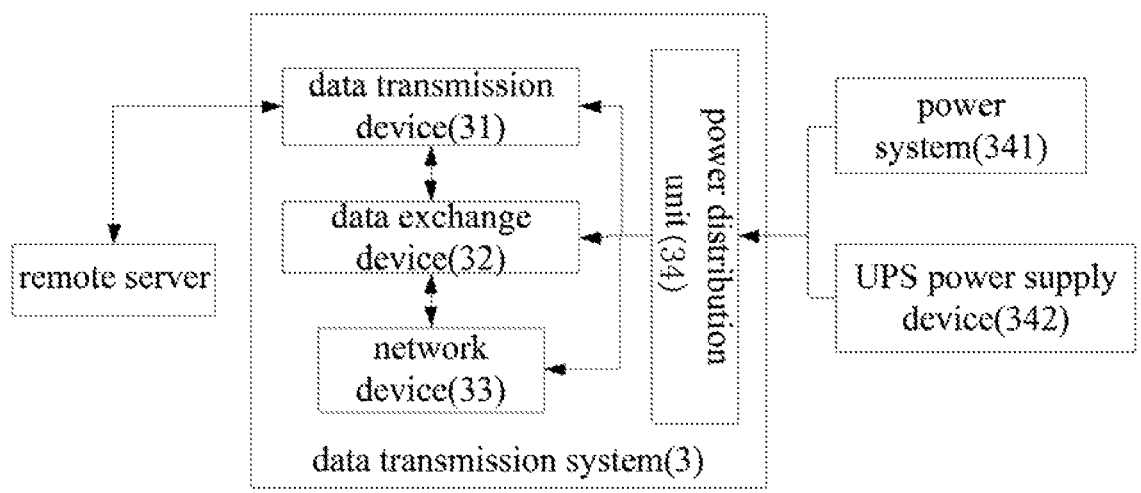
FIG. 5 is a basic frame diagram of a data transmission system of the invention.

FIG. 5 is a basic frame diagram of the data transmission system 3 of the invention. As shown in FIG. 5, the data transmission system 3 includes a data transmission device 31, a data exchange device 32 and a plurality of network devices 33, which are interconnected. The data transmission device 31 allows data transmission between itself and the outside (for example, a remote server). The data exchange device 32 is respectively connected to the data transmission device 31 and the plurality of network devices 33, and used to provide service of Ethernet data exchange and transmission between the plurality of network devices 33 and the data transmission device 31. Preferably, the data transmission system 3 further includes a power distribution unit 34 that can be connected to a power system 341, a UPS power supply device 342 or a combination thereof. The power distribution unit 34 is used to provide electricity for operation of associated devices such as the intelligent street light structure 10, 20, the data transmission system 3 and the antenna 2.

The cap 12, 22 is located at the top of the hollow lamppost 11, 21, and includes an antenna mounting pole 121, 221 and at least one through hole 122, 222. The antenna 2 is mounted on the antenna mounting pole 121, 221, and the through hole 122, 222 is used to provide a passage for allowing the wires 4 connected to the antenna 2 to go through the through hole 122, 222 into the hollow lamppost 11, 21 to be connected to the data transmission system 3 provided inside the hollow lamppost 11, 21, so as to interconnect the antenna 2 and the data transmission system 3.

Figure 3:
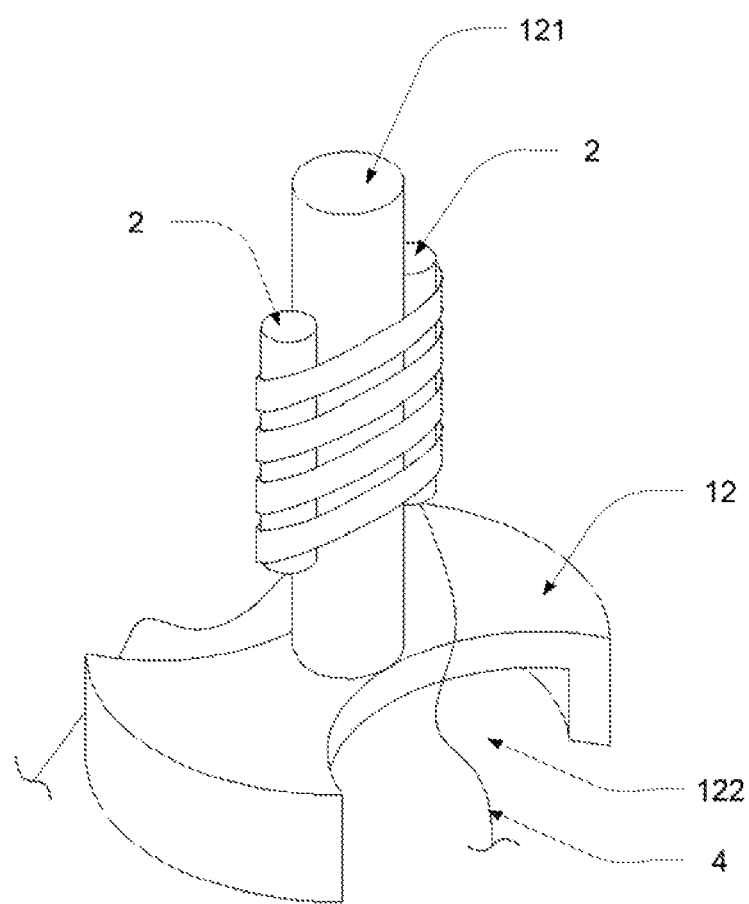
FIG. 3 is a partial structural schematic diagram of a cap of the intelligent street light structure according to the first embodiment of the invention.
Figure 4:
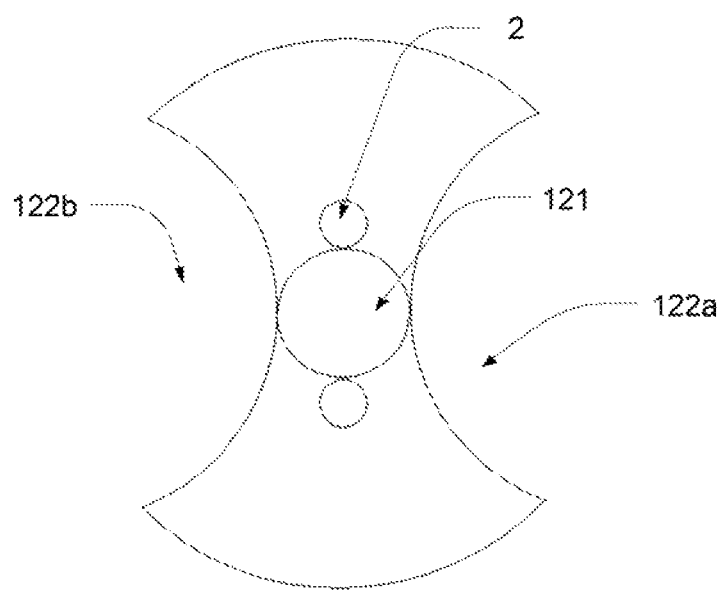
FIG. 4 is a top view of the cap of the intelligent street light structure according to the first embodiment of the invention.

Refer to FIGS. 3 and 4, which are respectively a partial structural schematic diagram and a top view of the cap 12 according to the first embodiment of the invention. In this embodiment, there can be mounted a plurality of antennas 2 on the antenna mounting pole 121 according to the variety of signals to be received. For example, as shown in FIG. 3, two antennas 2 are provided on two sides (left and right sides) of the antenna mounting pole 121 respectively, for receiving different bands of signals or even for receiving different sources of satellite signals. The antennas 2 can be GPS antennas or GNSS antennas. The number of antennas 2 is however not limited to two, but can be adjusted according to practical requirements. The cap 12 is formed with two through holes 122a, 122b on its two corresponding sides, wherein the two through holes 122a, 122b are arc-shaped and provided on left and right sides of the antenna mounting pole 121 (as shown in FIG. 4). The number and shape of the through holes 122 are however not particularly limited but can be adjusted according to practical requirements as long as the wires 4 connected to the plurality of antennas 2 on the antenna mounting pole 121 may go through the through holes 122a, 122b, which are located relatively close to the wires 4, to reach the receiving space 110 inside the hollow lamppost 11 and would not become wound.

Referring to FIG. 1, in this embodiment, the intelligent street light structure 10 further includes a wiring part 123 provided in the cap 12 or the hollow lamppost 11. The wiring part 123 is extended from the cap 12 into the hollow lamppost 11, or is directly placed inside the hollow lamppost 11. It is used to guide the wires 4 to be extended inside the hollow lamppost 11 in a predetermined direction, path, position or curvature without becoming wound in order to ensure the wires 4 functioning properly. Further in this embodiment, there may be a plurality of wiring parts 123 hung at intervals to the cap 12, for example, hooking parts (such as hooks) or wire material parts (such as wire loops) for hanging the wires 4. The wiring part 123 is not limited to such arrangement. It can also be a wireway part (such as a wiring trough) or a tubing part (such as a pipe).

The non-metallic shield 13, 23 covers the cap 12, 22, for protecting and shielding the antenna 2 and the wires 4 placed inside the cap 12, 22. Preferably, the invention further includes a lightning rod 131, 231 mounted at the top of the non-metallic shield 13, 23, for protecting the intelligent street light structure 10, 20 (including the data transmission system 3 provided therein) against lightning and thunder.

The binding part 14, 24 is used to bind at least one of the non-metallic shield 13, 23 and the cap 12, 22 to the hollow lamppost 11, 21 integrally. In the first embodiment of the invention, the binding part 14 is a lock part 14 (as shown in FIG. 1) that in turn penetrates the non-metallic shield 13, the cap 12 and the hollow lamppost 11. In the second embodiment of the invention, the binding part 24 is a fastening part 24 (as shown in FIG. 2) for fastening the non-metallic shield 23, the cap 22 and the hollow lamppost 21.

Moreover, on the intelligent street light structure 10, 20 of the invention there is further provided an external device 5 that can be an IP device or a sensor, such as security camera, temperature and humidity sensor, air quality sensor, RF signal sensor or Photocell, and so on. In the embodiment shown in FIG. 1, the external device 5 is mounted on a lamp 15 (such as light armature holder and fixture), and the lamp 15 is mounted externally on an upper end of the hollow lamppost 11, just like a lampstand structure of a traditional street light, wherein the wires 4 are used to interconnect the antenna 2, the data transmission system 3 and the external device 5. The external device 5 is however not limited to such arrangement. In the embodiment shown in FIG. 2, the external device 5 is mounted on a mounting support 25 that is a fixed bracket installed in the hollow lamppost 21. Alternatively, the external device 5 and the data transmission system 3 can both be provided above the carrier structure 2101. Moreover, there can further be formed an operation hole 213 and a cover plate 214 on the hollow lamppost 21 at positions corresponding to the mounting support 25, wherein the cover plate 214 may open or close the operation hole 213 to allow an operator to perform routine operations such as installation and maintenance on the external device 5 mounted in the hollow lamppost 21.

Therefore, the intelligent street light structure of the invention includes an antenna, a data transmission system, and wires for interconnecting the antenna and the data transmission system. This not only makes a traditional street light have a remote data transmission function and serve as a mobile base station to solve the existing problem of having difficulty in finding a place where base stations can be built, but also reduces construction costs and shortens construction periods of base stations, and improves utilization of public resources. Further, the structural design of having a cap, a non-metallic shield and a binding part may retain the original appearance of the street light and effectively protect the antenna and the data transmission system accommodated in the intelligent street light structure against external invasion. Moreover, communication base stations based on street lights have advantages of great signal coverage and even distribution, and thus may improve the quality of communication service.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. An intelligent street light structure including at least one antenna, a data transmission system and wires for interconnecting the antenna and the data transmission system, the intelligent street light structure further including:
   a hollow lamppost having a receiving space therein for accommodating the data transmission system;
   a cap provided at top of the hollow lamppost, the cap having an antenna mounting pole and at least one through hole, wherein the antenna mounting pole is for mounting the antenna thereon, and the through hole allows the wires to pass therethrough;
   a non-metallic shield mounted on the cap, for protecting and shielding the cap; and
   at least one binding part for binding at least one of the non-metallic shield and the cap to the hollow lamppost,
   wherein the hollow lamppost further has an operation hole and a cover plate for opening or closing the operation hole to expose or cover the receiving space.

2. The intelligent street light structure according to claim 1, further including: at least one external device, and a light armature holder/fixture that is provided on the hollow lamppost and for mounting the external device, wherein the wires are for interconnecting the antenna, the data transmission system and the external device.

3. The intelligent street light structure according to claim 2, wherein the external device is one of an IP device and a sensor.

4. The intelligent street light structure according to claim 1, wherein in the receiving space there are formed a carrier structure and a liquid guiding structure, wherein the carrier structure is for carrying the data transmission system thereon, and the liquid guiding structure is located above the carrier structure, for guiding any liquid inside the receiving space to flow away from the data transmission system.

5. The intelligent street light structure according to claim 1, further including: a wireless control opening/closing lock which can control the opening and closing of the cover plate by wireless communication, open and close the operating hole.

6. The intelligent street light structure according to claim 1, wherein the hollow lamppost or the cover plate has at least one vent for dissipating heat or moisture from the receiving space.

7. The intelligent street light structure according to claim 1, wherein the receiving space is located in a base of the hollow lamppost.

8. The intelligent street light structure according to claim 1, further including: a pumping device, which is activated to discharge any liquid in the hollow lamppost when the liquid is over a predetermined warning level, wherein the predetermined warning level is lower than a height of a position where the data transmission system is situated.

9. The intelligent street light structure according to claim 1, further including: a wiring part provided in the cap or the hollow lamppost, which is extended from the cap into the hollow lamppost or is directly placed inside the hollow lamppost, wherein the wiring part is for guiding the wires to be extended inside the hollow lamppost in a predetermined direction, path, position or curvature.

10. The intelligent street light structure according to claim 9, wherein the wiring part is a hooking part, a wire material part, a wireway part or a tubing part.

11. The intelligent street light structure according to claim 1, further including: a lightning rod provided at top of the non-metallic shield.

12. The intelligent street light structure according to claim 1, wherein the data transmission system includes a data transmission device, a data exchange device and a plurality of network devices, which are interconnected, wherein the data transmission device allows data transmission between itself and the outside, and the data exchange device is respectively connected to the data transmission device and the plurality of network devices, for providing service of data exchange and transmission between the plurality of network devices and the data transmission device.

13. The intelligent street light structure according to claim 12, wherein the data transmission system further includes a power distribution unit electrically connected to a power system, a UPS power supply device or both, for providing electricity required for operation.

14. The intelligent street light structure according to claim 1, wherein the wires are electric cables, optical cables, or a combination thereof.

15. The intelligent street light structure according to claim 1, wherein the cap is formed with two through holes, which are arc-shaped and provided on two sides of the antenna mounting pole.

16. The intelligent street light structure according to claim 1, wherein the binding part is a lock part that in turn penetrates the non-metallic shield, the cap and the hollow lamppost.

17. The intelligent street light structure according to claim 1, wherein the binding part is a fastening part for fastening the non-metallic shield to the cap and the hollow lamppost.

* * * * *